US011694392B2

(12) United States Patent
Kurz et al.

(10) Patent No.: US 11,694,392 B2
(45) Date of Patent: Jul. 4, 2023

(54) ENVIRONMENT SYNTHESIS FOR LIGHTING AN OBJECT

(71) Applicant: Apple Inc., Cupertino, CA (US)

(72) Inventors: Daniel Kurz, Sunnyvale, CA (US); Gowri Somanath, Santa Clara, CA (US); Tobias Holl, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/372,882

(22) Filed: Apr. 2, 2019

(65) Prior Publication Data

US 2019/0362539 A1 Nov. 28, 2019

Related U.S. Application Data

(60) Provisional application No. 62/674,690, filed on May 22, 2018.

(51) Int. Cl.
| | |
|---|---|
| *G06T 15/50* | (2011.01) |
| *G06T 7/73* | (2017.01) |
| *G06T 7/40* | (2017.01) |
| *G06T 19/00* | (2011.01) |

(52) U.S. Cl.
CPC .............. *G06T 15/50* (2013.01); *G06T 7/40* (2013.01); *G06T 7/73* (2017.01); *G06T 19/006* (2013.01)

(58) Field of Classification Search
None
See application file for complete search history.

(56) References Cited

U.S. PATENT DOCUMENTS

| | | |
|---|---|---|
| 6,842,175 B1 | 1/2005 | Schmalstieg et al. |
| 8,884,984 B2 | 11/2014 | Flaks et al. |
| 9,418,629 B2 | 8/2016 | Calian et al. |
| 9,737,814 B2 | 8/2017 | Suzuki et al. |

(Continued)

FOREIGN PATENT DOCUMENTS

| | | |
|---|---|---|
| EP | 1507235 A1 | 2/2005 |
| WO | 2015/031854 A2 | 3/2015 |

OTHER PUBLICATIONS

China National Intellectual Property Administration, Notification of First Office Action (with English translation), Chinese Patent Application No. 201910426485.3, 14 pages, dated Nov. 25, 2022.

*Primary Examiner* — Kyle Zhai
(74) *Attorney, Agent, or Firm* — Thompson Hine LLP

(57) ABSTRACT

Various implementations disclosed herein include devices, systems, and methods that render a reflective surface of a computer-generated reality ("CGR") object based on synthesis in a CGR environment. In order to render a reflective surface of the CGR object, one exemplary implementation involves synthesizing an environment map of a CGR environment representing a portion of a physical scene based on observed characteristics of the physical scene. In an implementation, generation of a complete environment map includes identifying pixels of the environment map with no corresponding texture and generating synthesized texture based on textural information associated with one or more camera images of the physical scene. In an implementation, a CGR object is rendered in the CGR environment, wherein an appearance of a reflective surface of the CGR object is determined based on the complete environment map of the CGR environment.

14 Claims, 11 Drawing Sheets

(56) References Cited

U.S. PATENT DOCUMENTS

| | | |
|---|---|---|
| 9,888,173 B2 * | 2/2018 | Zhang .................... G03B 37/02 |
| 10,777,010 B1 * | 9/2020 | Patel ..................... G06T 19/006 |
| 2008/0024523 A1 | 1/2008 | Tomite et al. |
| 2014/0226070 A1 * | 8/2014 | Zheng ..................... H04N 5/21 |
| | | 348/607 |
| 2017/0205892 A1 | 7/2017 | Petrovskaya et al. |
| 2017/0262247 A1 * | 9/2017 | Yoganandan ......... G06F 3/1446 |
| 2018/0075663 A1 | 3/2018 | Steed et al. |
| 2019/0362540 A1 * | 11/2019 | Chen .................... G06T 15/506 |

\* cited by examiner

ENVIRONMENT SYNTHESIS FOR LIGHTING AN OBJECT

CROSS-REFERENCE TO RELATED APPLICATION

This application claims the benefit of U.S. Provisional Application Ser. No. 62/674,690 filed May 22, 2018, which is incorporated herein in its entirety.

TECHNICAL FIELD

The present disclosure generally relates to rendering a computer-generated reality (CGR) object in a CGR environment, and in particular, to systems, methods, and devices for realistically rendering a reflective surface of a CGR object in a CGR environment.

BACKGROUND

The computer-generated reality (CGR) objects used by CGR systems are often intended to have a realistic and convincing appearance. For example, a CGR sofa that is based on a physical sofa may be placed in a separate physical room or a CGR vase that is based on a physical vase may be placed on a physical table. CGR objects, like many physical objects, often have reflective properties. For example, the surface of a vase may have an appearance that includes specular reflections of nearby physical objects. To achieve realistic appearances of such CGR objects rendered in CGR environments, the reflections on the CGR objects should accurately reflect the surrounding physical objects.

Existing CGR systems do not display CGR objects that have sufficiently accurate reflective surfaces. In many circumstances, a CGR system only has access to a particular camera view or a limited set of camera views and, thus, often lacks images of physical objects or portions of surrounding physical objects that should be reflected in a realistic surface on a CGR object. For example, a CGR system may not have images that capture a portion of a table that is outside of the camera field of view that should be reflected in the surface of a CGR vase inserted into the environment.

Some existing techniques for generating reflective surfaces use environment maps (also referred to as reflection maps). Environment mapping, or reflection mapping, is an image-based lighting technique for approximating the appearance of a reflective surface by means of a precomputed texture image. Textures for environment maps are generally provided by users. For example, a user may provide an image of a forest to generate an environment map that will be used for reflecting objects in a virtual world. However, using environment maps based on previously-captured scenes cannot provide realistic reflections for CGR objects in a current scene, as any objects present in the current scene that were not present in the previously captured scene are not presented in the reflections of the CGR objects.

Existing environment mapping techniques do not provide realistic reflections for CGR objects inserted into physical environments because the textures used to generate the environment maps are based on user-provided images of separate environments. The textures, and thus the CGR object reflections, do not accurately represent the tables, walls, and other physical objects surrounding the CGR object into which the CGR object is placed in the CGR environment.

SUMMARY

Various implementations disclosed herein include devices, systems, and methods that render a reflective surface of a computer-generated reality (CGR) object based on environment synthesis in a CGR environment. One exemplary implementation involves performing operations at a device with one or more processors and a computer-readable storage medium. In order to render a reflective surface of a CGR object, the device synthesizes an environment map of a CGR environment representing a portion of a real obphysical scene based on observed characteristics of the physical scene. For example, the device may determine an environment map that includes an extended surface based on a partial surface observed in one or more camera images of the scene. The device determines textural information (e.g., color, pattern, reflectance, irradiance, etc.) for the environment map and/or the extended surface of the environment map based on the one or more camera images of the physical scene. As another example, the device may generate a complete environment map of the CGR environment including synthesized texture by identifying pixels of the environment map with no corresponding texture and generating synthesized texture based on the determined textural information.

The device renders a CGRobject in the CGR environment. The appearance of a reflective surface of the CGR object is determined based on the complete environment map. In implementations, the device determines a position of the CGR object in the CGR environment, a reflectance of the CGR object, and/or the roughness of the material of the CGR object; the appearance of the reflective surface is based on the determined position, reflectance, and/or roughness. In an implementation, the device blends the synthesized texture and at least one adjacent texture of the environment map. In a further implementation, the device selects a center of projection of the environment map based on a three-dimensional ("3D") position of the CGR object and determines the appearance of the reflective surface of the CGR object based on the center of projection of the environment map. In a further implementation, the device selects a center of projection of the environment map based on the captured geometry of the physical environment, e.g., position, orientation, size, or extent of at least one detected surface of the environment. In yet another implementation, the device generates more than one environment map of the CGR environment including the extension portion of the surface of the environment and/or the synthesized texture. In implementations, the device renders the CGR object in the CGR environment on a screen and, in other implementations, the device renders the CGR object in the CGR environment on a semi-transparent display apparatus.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium stores instructions, which, when executed by one or more processors of a device, cause the device to perform or cause performance of any of the methods described herein. In accordance with some implementations, a device includes one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
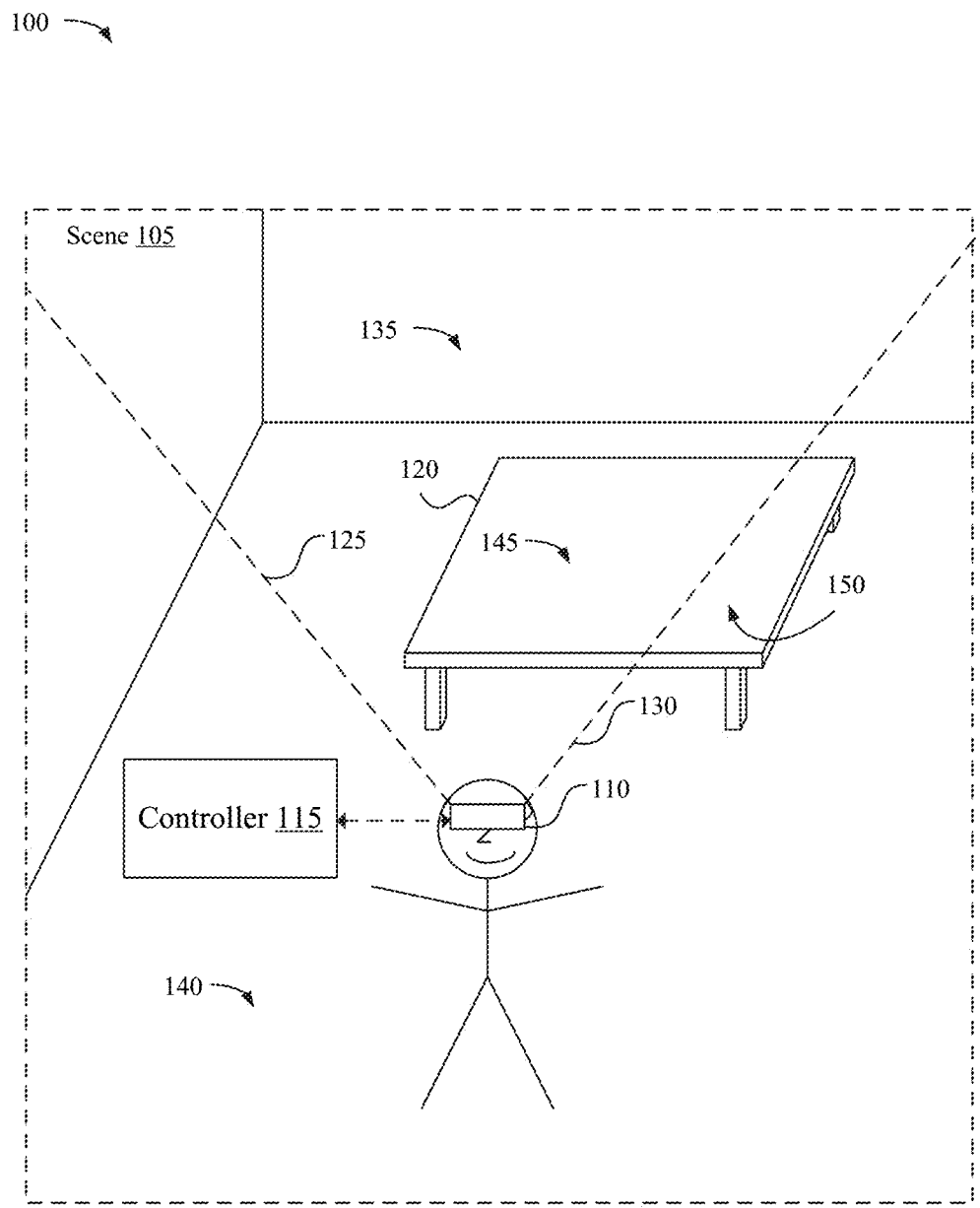
FIG. 1 is a block diagram of an example operating environment and a recorder/camera in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a CGR object rendering system includes one or more cameras/recorders and a processor that renders a reflective surface of a CGR object based on surface synthesis and/or environment map completion in a CGR environment. By more realistically rendering the reflective surface of the CGR object when superimposing the CGR object in a physical environment, the CGR object rendering system may increase the realism of the visual appearance of the CGR object.

Referring to FIG. 1, an example operating environment 100 for implementing aspects of the present invention is illustrated and designated generally 100. In general, operating environment 100 represents the various devices involved in presenting a user with a CGR experience. As depicted in the example of FIG. 1, the operating environment 100 involves a scene 105 being captured by a recorder/camera 110 in accordance with some implementations. In some implementations, each of controller 115 and recorder/camera 110 include a suitable combination of software, firmware, and/or hardware. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a recorder/camera 110 depicted as a head mounted display ("HMD") and a controller 115.

To present a user with a CGR experience, natural sensory information that the user perceives from a physical environment proximate to the user (e.g., scene 105) is overlaid with computer-generated information (e.g., two-dimensional ("2D") and/or 3D graphical content, sounds, tactile feedback, and the like) generated or at least processed by a computing device. For example, the physical environment, as represented by scene 105, may include surface 120. If surface 120 is a table and the computer-generated content is a video game character in this example, the user may see the video game character standing on the table as part of a CGR experience.

In operating environment 100, controller 115 is configured to manage and coordinate a CGR experience for a user. Controller 115 is described in greater detail below with respect to FIG. 8. In one implementation, controller 115 generates graphics data for display on a screen of an HMD. In one implementation, controller 115 is a computing device that is local to scene 105. For example, controller 115 may be implemented as a local server (e.g., a video game console) within scene 105. In one implementation, controller 115 is a computing device that is remote from scene 105. For example, controller 115 may be implemented as a remote server (e.g., a cloud server, an application server, a central server, and the like) external to scene 105. In one implementation, controller 115 is communicatively coupled with recorder/camera 110 via one or more wired and/or wireless communication channels (e.g., BLUETOOTH, IEEE 802.11x, IEEE 802.16x, IEEE 802.3x, and the like) and in another implementation, controller 115 may be a part of, or integrated into, an HMD. In another implementation, controller 115 may be integrated within the same enclosure of recorder/camera 110.

In some implementations, CGR content may be presented to the user in scene 105, as part of the CGR experience, via an HMD. For example, the user may wear an HMD on his/her head or otherwise on a device worn or attached to the user's body. In some implementations, the recorder/camera 110 is part of an HMD that is configured to present the CGR experience to the user. In other implementations, the recorder/camera 110 is part of a handheld electronic device (e.g., a smartphone or a tablet) configured to present content to the user. In one implementation, an HMD includes a screen to display CGR content in a field-of-view of the user. In one implementation, a screen to display CGR content in a field-of-view of the user is provided by a portable computing device (e.g., a smartphone, a tablet, and the like) that is coupled to an HMD. In some implementations, the functionalities of controller 115 are provided by and/or combined with an HMD.

The user may modify (or otherwise interact with) the CGR content, as part of the CGR experience, using a secondary device. To that end, in some implementations, a secondary device is configured to provide user input to controller 115. A secondary device may provide user input to controller 115 to modify the CGR content presented via an HMD. For example, a secondary device may include one or more user input mechanisms. In this example, the user may cause a secondary device to send a corresponding instruction (or command) to controller 115 and/or an HMD by manipulating the one or more user input mechanisms. Upon receiving that instruction, controller 115 and/or the HMD would modify the CGR content presented to the user via the HMD in accordance with that instruction. In one implementation, the one or more user input mechanisms include a physical input mechanism (e.g., a button, joystick, switch, knob, dial, and the like). In one implementation, the one or more user input mechanisms include a computer-generated input mechanism (e.g., a softkey, a virtual keyboard, and the like). Another way that a secondary device could provide user input to controller 115 to modify the CGR content presented via an HMD involves changing correspondences (e.g., relative positions and/or orientations) between the HMD and the secondary device.

Referring to FIG. 1, the recorder/camera 110 is placed at a location relative to the scene 105 to capture light from the scene 105. FIG. 1 also includes an exemplary surface 120, e.g., a table. In an implementation, a left boundary 125 and a right boundary 130 define a captured geometry/texture 135 of the scene 105, as may be determined by the capabilities of the recorder/camera 110; the left boundary 125 and the right boundary 130 may also define an uncaptured geometry/texture 140 of the scene 105. Moreover, the left boundary 125 and the right boundary 130 may further define an exemplary captured surface portion 145 and/or a missing surface portion 150, such as in the case where the surface 120 does not fall entirely within the captured geometry/texture 135 of the scene 105. While not shown, it should be appreciated that captured geometry/texture 135 and uncaptured geometry/texture 140 may also be defined by top and bottom boundaries that are similarly determined by the capabilities of the recorder/camera 110.

Figure 4:
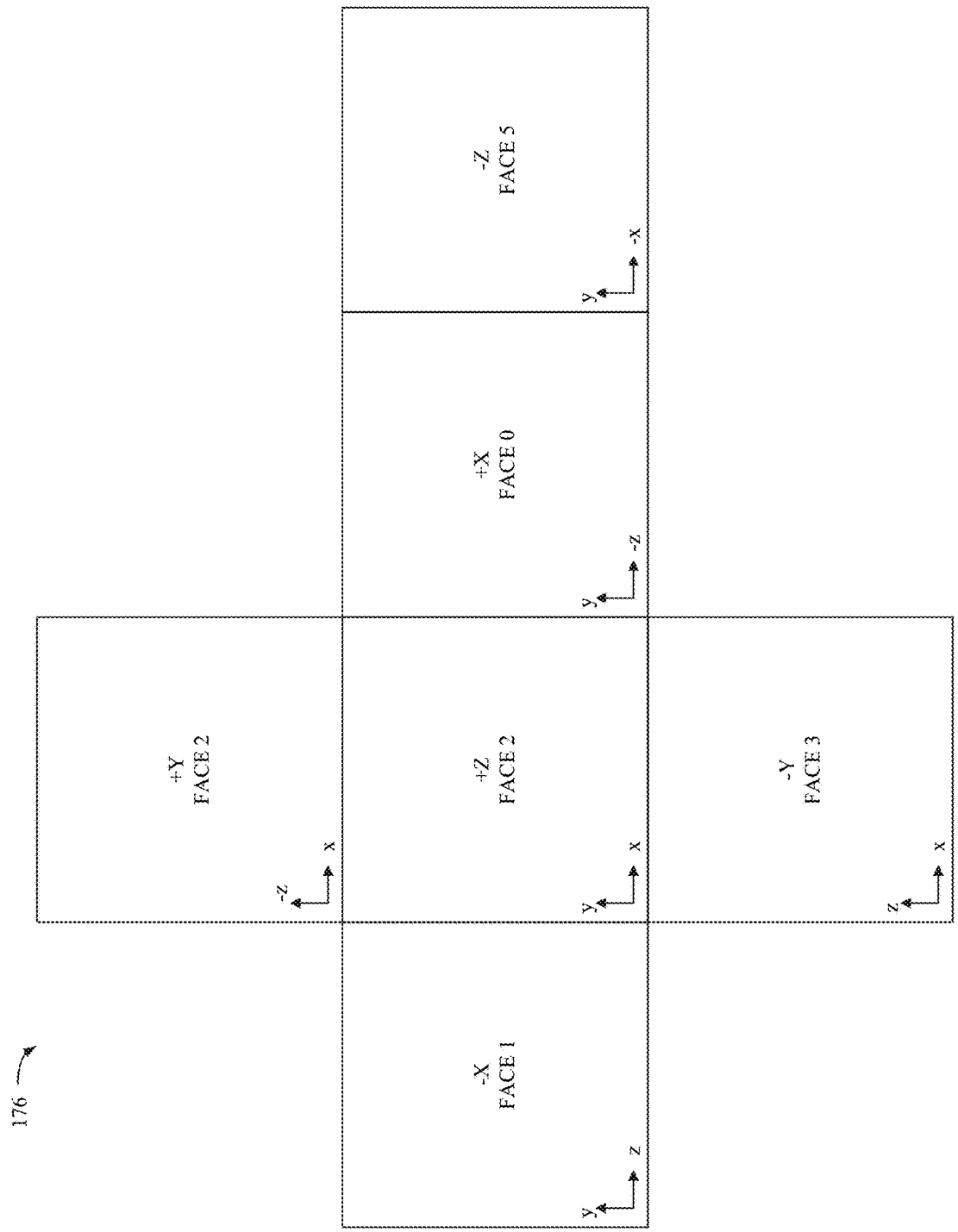
FIG. 4 is a diagram of an illustrative cube map.

In implementations, several different ways of storing the captured geometry/texture 135 may be employed. In implementations, sphere mapping may be used to create a single texture containing an image of the surroundings as reflected on a mirror ball. In other implementations and as shown in FIG. 4, cube mapping may be used such that the environment is projected onto the six faces of a cube and stored as six square textures or unfolded into six square regions of a single texture. As understood by one of ordinary skill in the art, other suitable projections may also be used in implementations, e.g., paraboloid mapping, pyramid mapping, octahedron mapping, and HEALPix mapping. In other embodiments, the captured geometry 135 may be stored as a set of geometric primitives, such as points, voxels, triangles, quadrangles, or planes, possibly comprising texture coordinates. In yet other embodiments the captured texture 135 may be stored as at least one bitmap storing the texture on at least one of the geometric primitives.

In CGR environments, planar surfaces are of special interest due to their importance for user interaction (e.g. placement of CGR objects). In addition, the 3D geometry of the physical environment is not known in advance as in traditional computer graphics applications, but is instead estimated in real-time. Therefore the optimal positions for placing environment maps is not known in advance and needs to be determined dynamically. As appreciated by one of ordinary skill in the art, illustrative references to "planes" and/or "planar" are not intended to be limited to a strict mathematical definition of a flat surface that extends indefinitely in two dimensions; e.g., "planes" and/or "planar" may also refer to a portion of a plane or flat surface. Examples of the objects that may include a surface 120 include, but are not limited to, a table, a floor, a wall, a desk, a book, a body of water, a mountain, a field, a vehicle, a counter, a human face, a human hand, human hair, another human body part, an entire human body, an animal or other living organism, clothing, a sheet of paper, a magazine, a book, a vehicle, a machine or other man-made object having a surface, and any other object or scenery that may exhibit a surface over time.

Furthermore, a computer-generated representation of the captured geometry/texture 135 of the scene 105 may include any number of surfaces which can be reduced to a generally incomplete environment map representation. Accordingly, as appreciated by one of ordinary skill in the art, a computer-generated representation of the captured geometry/texture 135 of the scene 105 may include any number of captured surfaces which can be reduced to a generally incomplete environment map representation. It follows that uncaptured surfaces may also include one or more surfaces making up a part of the environment map or reflection environment map. Thus, surface 120, including captured surface portion 145 and missing surface portion 150, is provided as a basic illustrative surface and is not intended to limit a surface and/or captured geometry of this disclosure to a particular object or portion of an environment map. Techniques disclosed herein can be used to identify one or more surfaces or geometries in a scene and thus, in some implementations, can be used to identify individual surfaces or geometries and in other implementations to identify all the surfaces or geometries in a 3D scene. Moreover, texture information associated with the captured geometry/texture 135 and/or surface 120 may include, for example, color or appearance. The information about geometries, including surfaces, in a scene may be used for numerous purposes including, but not limited to, purposes that involve generating or synthesizing light sources, shadowing, or otherwise impacting the rendering of the CGR object 155 or scene 105.

Figure 2:
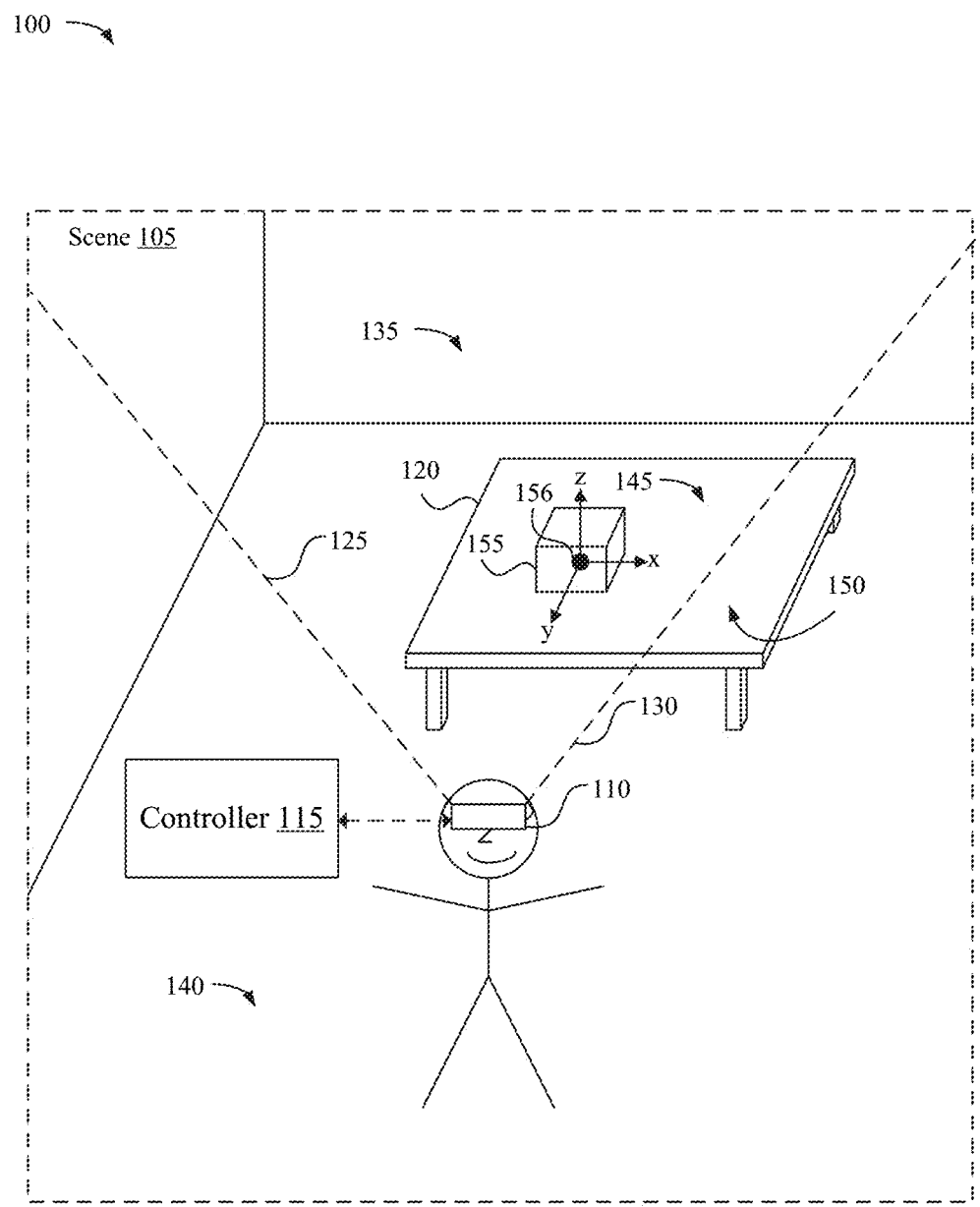
FIG. 2 is a block diagram of the example operating environment of FIG. 1 and a CGR object in accordance with some implementations.

FIG. 2 is a block diagram of the example operating environment 100 of FIG. 1 and a CGR object 155 in accordance with some implementations. As illustrated in exemplary FIG. 2, the CGR object 155, e.g., a cube, is rendered on the surface 120, including a viewpoint 156 of the CGR object 155. The viewpoint 156 may also be referred to as the pose of CGR object 155 and it may be parametrized by a six-degree-of-freedom rigid body transform. For illustrative purposes, the viewpoint 156 includes reference Cartesian axes as a proxy geometry. As understood by one of ordinary skill in the art, implementations may employ any suitable viewpoint orientation, orientation references, and/or proxy geometry. In the exemplary implementation, left boundary 125 and right boundary 130 define the captured geometry/texture 135 of the scene 105, as well as the uncaptured geometry/texture 140 of the scene 105. The CGR object 155 is rendered on an exemplary captured surface portion 145. A missing surface portion 150 falls within the uncaptured geometry/texture 140 of the scene 105 and may represent one or more surfaces of an environment map of the scene 105. In an exemplary implementation, the captured surface portion 145 is identified based on texture (e.g., color), e.g., the captured portion exhibits differing texture than its surroundings.

In a physical environment, a physical object may exhibit reflectivity, dependent upon the reflective properties of the object. Accordingly, a user or viewer would expect a CGR object in a CGR environment to exhibit the same or similar reflectivity. However, due to the boundaries, e.g., the left boundary 125 and the right boundary 130, of the image(s)/recording(s) used to develop the CGR environment, e.g., the captured geometry/texture 135 of the scene 105, a CGR object rendering system may lack information regarding the uncaptured geometry/texture 140 of the scene 105 and thus be incapable of accurately rendering a reflection of the uncaptured geometry/texture 140 of the scene 105 on the CGR object, e.g., CGR object 155. In an implementation, the CGR object rendering system may lack information regarding one or more surfaces, e.g., surface 150, and thus be incapable of accurately rendering a reflection of the particular surface(s) on the CGR object, e.g., CGR object 155.

In an implementation, the CGR object may be a piece of furnishing or an interior decorator item, as in an interior design application. In alternative implementations, the CGR object may be a vehicle or vehicle customization. In further implementations, a CGR object may be an enemy, ally, or opponent, as in a gaming scenario. Moreover, as appreciated by one of ordinary skill in the art, the CGR object may be any object a user may wish to render in a CGR environment.

Figure 3:
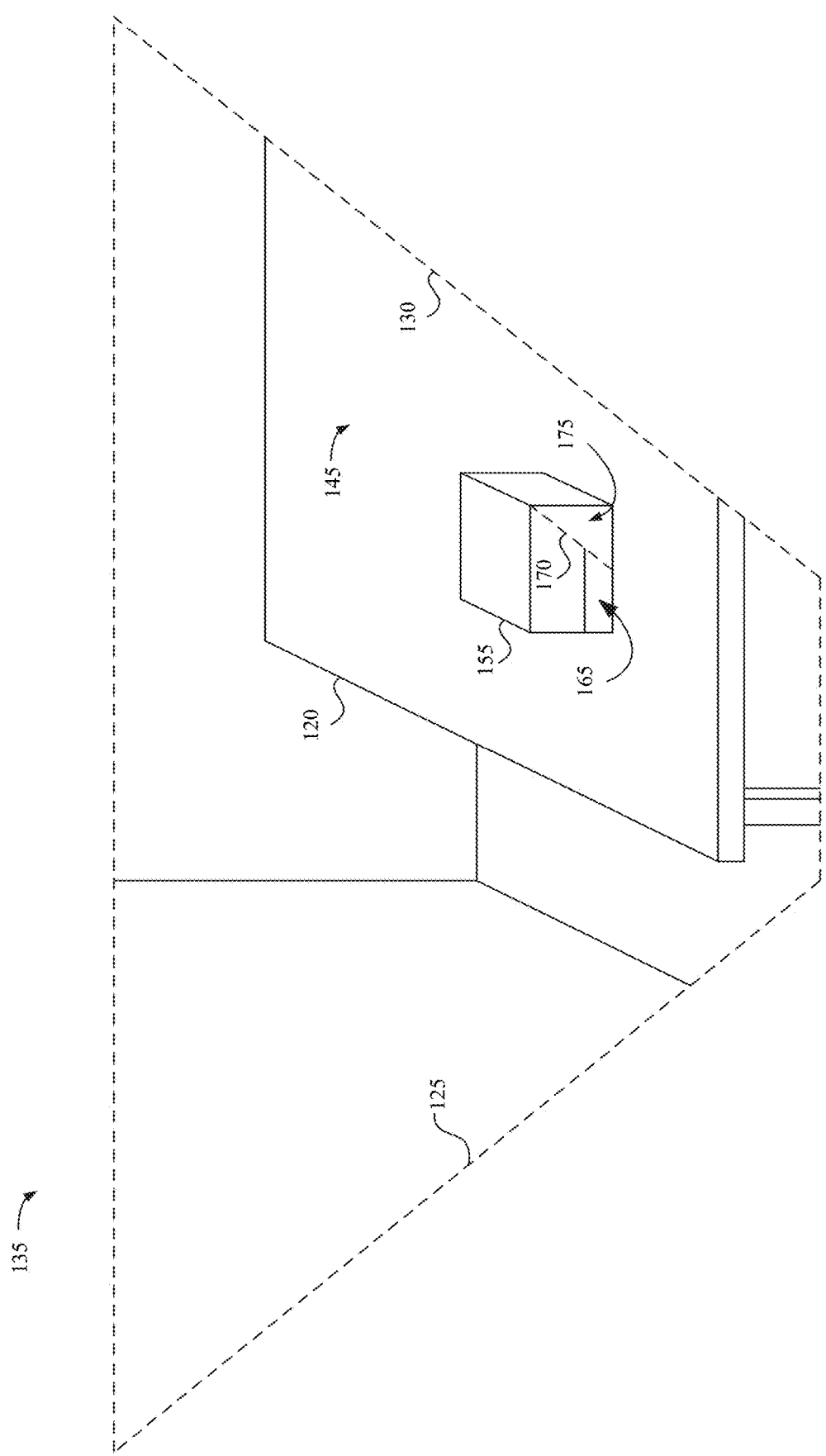
FIG. 3 is a block diagram of the captured geometry of operating environment of FIG. 1.

FIG. 3 depicts the captured geometry/texture 135 of the scene 105 of FIG. 1 captured by the recorder/camera 110. In the exemplary implementation, the outermost edges of the captured geometry/texture 135 are defined, in part, by left boundary 125 and right boundary 130 and a reflection 165 is generated on the CGR object 155. Because the captured geometry/texture 135 is limited by the boundaries of the image(s)/recording(s) used to develop the CGR environment, the generated reflection 165 does not include the entirety of the scene 105, including surface 120. In the exemplary implementation, a reflection cutoff 170 defines an outermost boundary of surface 120, such that a missing reflection portion 175 cannot be generated on the CGR object 155.

The captured scene geometry/texture 135 may also be generated from multiple images/recordings from one or more cameras, where the multiple captured images/recordings from one or more cameras are combined to form the captured geometry/texture 135 of the scene 105 and/or multiple captured portions of the surface 120 are combined to form the captured surface portion 145. As appreciated by one of ordinary skill in the art, exposure differences between the multiple captured images/recordings may be compensated for by using any number of techniques, including histogram analysis (e.g., matching histograms between individual key frames), spatial registration (e.g., identifying corresponding pixels and determining a transformation from the intensities of one keyframe to the corresponding intensities in another keyframe), transforming image intensities based on camera or ISP parameters, or image balancing (e.g., modifying image intensities to match across the respective images).

In implementations, it may be beneficial to simplify scene 105 to promote efficient rendering of scene 105 for lighting and reflections by a computer graphics engine. In computer graphics, environment mapping, (e.g., reflection mapping), is an efficient image-based lighting technique for approximating the appearance of a reflective surface by means of a precomputed texture image; the texture is used to store the image of the distant environment surrounding the rendered object.

For example, this simplification may be performed by projecting the scene 105 to one or more omnidirectional 2D maps, e.g., environment maps. In implementations, environment maps are implemented as 2D images at predefined positions. Any single environment map is only strictly valid for a single point in 3D space, which is referred to as the center of projection, e.g., viewpoint 156 of the virtual object 155. Thus, the center of projection is used to project a 3D scene onto an environment map by providing a point of reference for the environment map. In implementations, validity beyond the single center of projection may be extended by attaching a simple proxy geometry (e.g., a rectangular cuboid) to the environment map; the 2D map can then later be re-projected back onto this proxy during lighting related rendering calculations. It follows that, in order to perform environment mapping to achieve visually pleasing reflections (e.g., lighting effects such as reflections) on rendered CGR objects, a sufficiently dense sampling of the 3D scene with appropriately chosen proxy geometry is necessary.

Environment maps are most commonly computed by re-projecting the 3D scene using a chosen format. A 3D scene may be re-projected onto 6 faces of a cube, onto a sphere, or two paraboloids while using a single center of projection. The re-projection is then mapped from the given surfaces onto a 2D texture via texture mapping and represents the 3D scene for the given center of projection. For example, a cube map of the scene 105 may be rendered from the viewpoint 156 of the CGR object 155 by projecting 6 renderings that represent the 6 faces of a cube into an environment map, such as the cube map 176 shown in FIG. 4. Then the scene 105 may be rendered a second time from the regular viewpoint of the recorder/camera 110 and the generated reflection 165 of the CGR object 155 may be computed based on the cube map.

Reflection Probes may be used as a source of reflected and ambient light for objects inside their area of influence, which may be defined by its proxy geometry. A probe of this type captures and stores its surroundings. In implementations, one or more reflection probes are used to dynamically generate cube maps for use as reflection textures. Reflection probes may be placed at the center of a CGR object, e.g., viewpoint 156 of the CGR object 155 shown in FIG. 2, or the specific mesh that will use the environment map, and the probe internally generates a ghost camera at the specific position. The ghost camera then renders the geometry/texture of the physical environment from that location. Accordingly, the position of a reflection probe is determined by the position of the CGR object, e.g. CGR object 155, or the position of a reflective surface associated with the CGR object. In a different embodiment, the position of a reflection probe is determined based on the captured geometry/texture of the physical environment.

A cube map is generated by rendering the scene six times from a viewpoint, where the views are defined by a 90 degree view frustum representing each cube face. For example, as shown in FIG. 2, the viewpoint 156 of the CGR object 155 is marked along with a proxy geometry, e.g., Cartesian axes. FIG. 4 shows a cube map 176 where the faces are labeled based on the proxy geometry of FIG. 2, relative to viewpoint 156 of the virtual object 155, and each face of the cube map 176 would be mapped with an image in the corresponding direction as seen from the viewpoint 156 of the CGR object 155. Thus the environment is mapped onto the six faces of the cube map 176 by projecting the captured geometry/texture 135 onto the sides of the cube and storing it as six square textures, e.g., unfolded into six regions of a single-texture.

While other forms of environment mapping such as sphere mapping (also referred to as equirectangular or lat-long projection/mapping) may be employed in implementations, it is to be noted that cube mapping addresses inherent flaws associated with sphere mapping. Also, warping and distortion, e.g., along the edge of the sphere, often results from sphere mapping because a texture must be stretched and compressed to be mapped onto a sphere's surface.

The environment map may be static, e.g., the reflected environment stays consistent, or may be dynamic, where the map texture is updated to represent a dynamically changing environment. For example, environment maps may be computed at runtime for every frame. Other environmental projections can also be converted into a cube map, e.g., from equirectangular projection to cube map.

As appreciated by one of ordinary skill in the art, the captured scene geometry/texture 135 may be mapped onto any appropriate canonical coordinate system, e.g., plane coordinates, world coordinates, geometry coordinates, etc. For example, a 360-degree (spherical) image around a point of projection may be used as an environment map (or environment reflection map) in standard computer graphics renderers. Moreover, the environment map may be represented in any number of interchangeable formats, e.g., spherical representation (equirectangular projection) or cubemap representation. As further understood by one of ordinary skill in the art, the choice of format may be based on the requirements of a particular developer and/or rendering engine.

As shown in FIG. 3, the appearance of the reflection 165 may be dependent upon the distance, relative position, and/or orientation of the recorder/camera 110 to the CGR object 155 and or the surface 120, the amount/intensity of light captured by the recorder/camera 110, and/or the presence or absence of particular light sources. For example, a more detailed reflection 165 may be required for a CGR object 155 having a polished finish or appearance that is presented in a well-lit environment 100, as compared to a CGR object 155 having a brushed finish or appearance that is presented in a low-lit environment 100. Moreover, the rendering system may identify different reflective characteristics for the CGR object 155 by identifying the geometry of the CGR object 155. Furthermore, in implementations, the rendering system may identify differing characteristics based on the position of the CGR object 155 in the environment 100, for example, a distant overhead view of the CGR object 155 may require a differing reflection 165 from a near front-facing view of the CGR object 155. Also, the specific locations of the outermost boundaries, e.g., the left boundary 125 and the right boundary 130, may be dependent upon the field of view of the recorder/camera 110.

Figure 5:
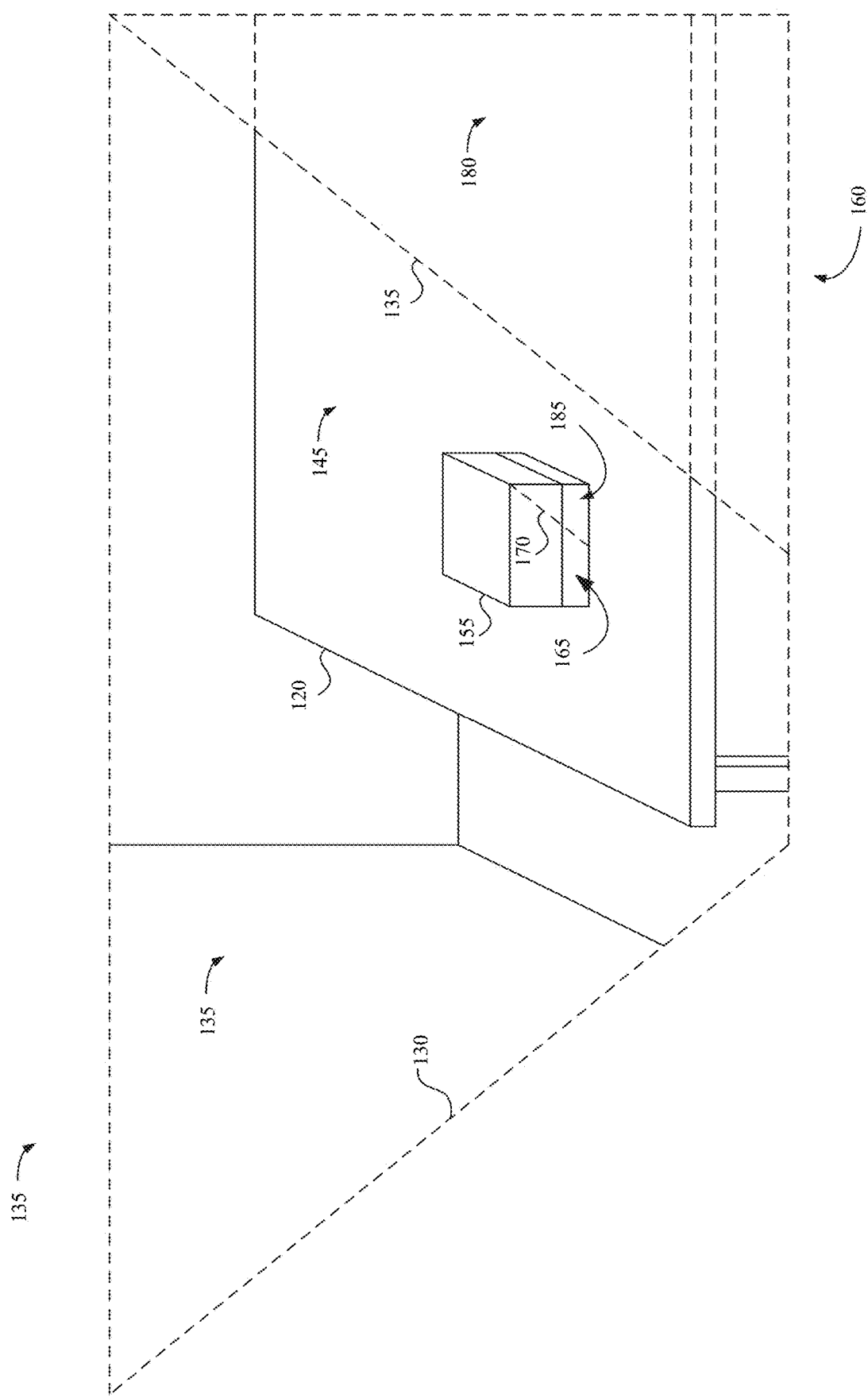
FIG. 5 is the 3D model of FIG. 3 with an extension portion added to the 3D model.

FIG. 5 depicts the captured geometry/texture 135 of FIG. 3 with extended content. In order to accurately depict the generated reflection 165 on the CGR object 155, the system identifies whether the captured surface portion 145 adequately represents the surface 120 and, if not, an extension portion 180 may be generated. The system then determines an extended geometry of the CGR environment representing the physical scene based on the extension portion 180.

In implementations, the system may determine whether a corresponding texture for all of the pixels of the captured geometry/texture 135 of the scene 105 is known and, if there are pixels with no texture, the missing texture may be synthesized. In an exemplary implementation, such identification may be made based on the texture of the captured surface portion 145 in comparison to the immediately surrounding texture, e.g., whether the captured portion is terminated by the surrounding environment.

Given an extended scene geometry, texture is synthesized for the extended parts of the geometry. Accordingly, one or more algorithms may use texture information from the determined part of the environment geometry as a basis for the synthesis of the texture of the extended geometry. In implementations, an image and a mask are stored, where the mask has binary values to indicate which pixels in the image are known and which are incomplete, e.g., need to be synthesized/filled. When the extended part of the geometry is a plane, the search and copy of patches can be done at a single scale if the texture image has been rectified. For other geometries, compensation may need to be performed for changes in scale and orientation. For example, if the object in the image is a non-planar like a chair, then patches from regions that have similar normal can be copied, e.g., parts of the seat can be completed using patches from known regions of the seat and not differently oriented surfaces like the back or the legs. Thus, the system can generate (or enhance) the environment map using the extended geometry 160 as well as textural information associated with the surface 120 and renders the CGR object 155 in the CGR environment based on the enhanced environment map.

In implementations, the completion of an environment map may include synthesizing a corresponding texture for the pixels with no texture by extending the existing texture and/or employing synthesis algorithms, e.g., machine learning based algorithms. Furthermore, additional processing steps may be performed to the one or more textures themselves, individually or as a collection.

For example, in a patch-match based approach, for each pixel in the unknown region, a "compatible" patch can be copied from the known region. This selection of the compatible patch can be made by starting to fill pixels that are at the boundary of the known and unknown region. For each such pixel, a patch P of N×M pixels around it may be extracted, such that the patch P contains some known pixels. Then a search may be conducted in the known region of the image for a patch that matches P. This matching may be performed by measuring similarity or error using color differences or other perceptual measures. Once found, the unknown pixels of P may be filled using the selected patch colors. In implementations, the search may be performed using efficient search using techniques similar to that described in Connelly Barnes, Eli Shechtman, Adam Finkelstein, and Dan B Goldman. PatchMatch: A Randomized Correspondence Algorithm for Structural Image Editing. ACM Transactions on Graphics (Proc. SIGGRAPH) 28(3), August 2009. In implementations, machine learning may also be used such that a neural network is trained to take the (partial) image and mask as inputs and to return the filled/completed image.

In an exemplary implementation, the extension portion 180 may be generated by extending the geometry of the captured surface portion 145 in the captured scene geometry/texture 135 and applying any texture information associated with the surface 120, thereby extending the model of the 3D environment to include the extension portion 180. In an exemplary implementation, the captured surface portion 145 is assumed to extend indefinitely (e.g., continue to repeat itself) when generating the extension portion 180, however alternative assumptions could be made about the surface 120 based on the captured surface portion 145. For example, the system may be configured to refer to a database to make assumptions about the surface 120 based on characteristics of the captured surface portion 145, e.g., identifying the characteristics of the captured surface as partially or fully matching stored reference characteristics of a table. Moreover, a repeating pattern or texture of the captured surface portion 145 may be similarly repeated in the extension portion 180. However, in implementations, the system may identify specular highlights on the captured surface portion 145 (e.g., highlights from overhead light sources) and determine whether to repeat the specular highlights when generating the extension portion 180. In further implementations, additional 3D objects associated with the captured surface portion 145 may be "flattened" and treated as part of the captured surface portion 145, e.g., a ball resting on a table may be flattened to a circle associated with the surface of the table. In alternative implementations, such 3D objects associated with the captured surface portion 145 may be disregarded when generating the extension portion 180.

As shown in FIG. 5, based on the extension portion 180, the system may generate synthesized reflection 185 on CGR object 155. Accordingly, based on the captured surface portion 145 and the extension portion 180, the CGR object 155 (including the generated reflection 165 and the synthesized reflection 185) is more accurately depicted.

In implementations, the generated reflection 165 and the synthesized reflection 185 may be calculated by manually or automatically selecting a 3D point, e.g., a center of projection, where the reflection of the environment is accurately depicted in relation to the position of the CGR object 155 in the environment. For example, if the CGR object 155 consists of two vertically stacked spheres, where the bottom sphere is not reflective and the top sphere is reflective, the selected center of projection may be the center of the top reflective sphere. As an alternative example, if the CGR object 155 consists of a non-reflective robot wearing a reflective visor, the selected center of projection may be the center of the visor and not the center of the robot's body. In implementations, an environment map, e.g., a cube map or a sphere map, may be generated, based on the captured scene geometry/texture 135, around the center of projection using a rendering engine to represent the textures of the captured scene geometry/texture 135.

In some implementations, the center of projection of the cubemap of a reflectance probe is determined based on the determined geometry of the physical surfaces in the CGR scene. For example, the geometry of the physical surfaces in the CGR environment can be approximated by a set of finite, planar surfaces (e.g. quadrangles or triangles in 3D space), and the center of projection of an environment map may be selected above the center of a such planar surface, along the surface normal at a distance that is half the extent of the planar surface. The extent of the region of impact of the reflectance probe may use a box as a proxy geometry with its center at the center of projection and aligned with the planar surface so that one side of the box coincides with the planar surface. If the physical surfaces in the CGR environment are approximated by more than one planar surface, implementations of this method may generate a separate reflection probe for each planar surface individually where the center of projection may be selected above the center of each planar surface. When using multiple reflection probes in a CGR environment, while each of them has its own individual center of projection and extent, depended on the geometry of only a subset of the CGR environment, the generation of the texture of each reflection probe may be based on all determined parts of the geometry and texture of the CGR environment. For calculating reflections in rendering engines, a CGR environment may be best represented as an approximation in the form of a minimal optimal set of cube maps and associated proxy geometry (e.g. 3D boxes). The environment maps for the approximation may be placed in such a way that the difference between the reflectance of a CGR object affected by the box placeholders is similar to generating the cube map exactly at the CGR object's position.

The amount/size of the extension portion 180 may be dependent on the location and/or orientation of the recorder/camera 110 with respect to the CGR object 155 and the rest of the captured geometry/texture 135 of the operating environment 100. For example, in implementations where the exact dimensions are determined for the surface 120 based on characteristics of the captured surface portion 145, e.g. as determined from a reference database, the size of the extension portion 180 may be calculated based on the geometry associated with the angle of incidence and distance of the recorder/camera 110 with respect to the CGR object 155. As another example, a larger and/or longer extension portion 180 may be determined when there is a high angle of incidence between the recorder/camera 110 and the surface 120, e.g., the extension portion 180 may extend indefinitely. Other attributes of the extension portion 180, including texture information, e.g., color, may also be dependent upon the corresponding attributes or texture of the surface 120.

As appreciated by one of ordinary skill in the art, the disclosed exemplary implementation of the captured scene geometry/texture 135 sets forth surface 120 by utilizing captured surface portion 145 and extension portion 180, but implementations of the invention may alternatively set forth non-planar surfaces, including captured non-planar surfaces and synthesized non-planar surfaces, e.g., surfaces with complex geometry. Moreover, exemplary implementations may use planes, triangle meshes, or volumetric representations to generate the captured scene geometry/texture 135, captured surface portion 145, and/or extension portion 180. In alternative implementations, reference computer-aided drawing ("CAD") models may be used to represent objects in the 3D model, including the captured surface portion 145, extension portion 180, and/or the CGR object 155.

Furthermore, the generated reflection 165 and the synthesized reflection 185 may be dependent on the reflectivity of the CGR object 155. The reflectivity of the CGR object 155 may be determined based on a user selection or adjustment, an input received by the system, or may otherwise be associated with the CGR object 155 itself, e.g., the material composition or properties of the CGR object 155 such as the material roughness, the material metalness, the material glossiness, the material specularity, or any other Physically Based Rendering (PBR) or Physically Based Shading (PBS) material properties. For example, a CGR object 155 with high reflectance may require a highly-defined generated reflection 165 and synthesized reflection 185, exhibiting the captured surface portion 145 and the extension portion 180 in great detail, while in another example, a CGR object 155 with very little reflectance may only require minimal definition and detail of the reflection of the surface 120.

In an exemplary implementation, a transition between the captured surface portion 145 and extension portion 180 may be blended to avoid a harsh or unrealistic transition between the texture of the captured surface portion 145 and extension portion 180. Furthermore, the borders of the captured surface portion 145 and/or the extension portion 180 may be blended with the surrounding environment. Likewise, the borders of the generated reflection 165 and/or the synthesized reflection 185 may be blended with the surface of the CGR object 155 in order to provide a more realistic appearance.

In implementations, deep learning is used for the extension, or completion, of the environment map. A convolutional neural network, also referred to as "CNN" or "network" may take an input environment map, as well as a mask indicating which pixels are known from previous parts of the pipeline and which pixels are unknown and need to be synthesized. The colors in the unknown pixels are filled with random values in the input to the network. The network outputs a completed environment map of the same dimensions as the input environment map. In implementations, the network follows an encoder-decoder architecture. The encoder consists of blocks of layers which reduce the spatial dimension of the input sequentially to produce an encoding. This is followed by a set of layers which perform the function of completion. The decoder consists of layers that mirror the initial blocks to upsample and produce an output of same spatial dimension as the input.

In other implementations, the network is trained in a supervised way and employs equirectangular (spherical) projection format for the environment maps. Equirectangular projection (e.g., equidistant cylindrical projection or geographic projection) may be used to transform spherical coordinates into planar coordinates (forward projection) or to transform planar coordinates into spherical coordinates (reverse projection). Moreover, equirectangular projection presumes a spherical model and maps meridians to vertical straight lines of constant spacing (for meridional intervals of constant spacing), and circles of latitude to horizontal straight lines of constant spacing (for constant intervals of parallels). The forward projection transforms spherical coordinates into planar coordinates.

Equirectangular projection may be performed using the following equations: $x=(\lambda-\lambda_0) \cos \varphi_1$ and $y=(\varphi-\varphi_1)$ for forward projection;

$$\lambda = \frac{x}{\cos \varphi_1} + \lambda_0$$

and $\varphi=y+\varphi_1$ for reverse projection; and where $\lambda$ is the longitude of the location to project, $\varphi$ is the latitude of the location to project, $\varphi_1$ are the standard parallels (north and south of the equator) where the scale of the projection is true; $\lambda_0$ is the central meridian of the map; x is the horizontal coordinate of the projected location on the map; and y is the vertical coordinate of the projected location on the map. In some implementations, during reverse projection from planar into spherical coordinates an additional smoothing step may be performed to mitigate artifacts at the image boundaries, e.g., by performing a smoothing operation wrapping across the image boundaries. For example, in an implementation in which the network generates planar (equirectangular) images, the intensities in the left-most pixel column may be inconsistent with those in the right-most pixel column, which may result in an undesirable seam when wrapped onto a sphere; a smoothing step may be performed to remedy or eliminate the seam.

Supervised training of a machine learning model (e.g. a CNN) to perform texture synthesis or environment map completion requires training data. Given an original complete environment map, a subset of pixels may be randomly determined and then the subset of pixels may be treated as unknown, e.g., identified for completion. Prior to providing the environment map as an input to the model during training, the intensity values at the subset of pixels may be overwritten with random values and, as additional input, a binary mask is generated that has a value of 0 on the subset of pixels while all other pixels are set to 1. Stochastic gradient decent may be used to optimize the model such that a loss function, which is indicative of the difference between the original complete environment map and the output of the neural network, is minimized.

In implementations, a weighted combination of loss functions between the ground-truth and output of the network are employed. Moreover, the goal of training is to minimize output losses. For example, pixel loss is determined in implementations using an L1-loss algorithm, where the sum of absolute differences between the output and ground-truth images is measured.

In other implementations, loss is determined using a structural similarity loss (SSIM) algorithm employing a similarity metric employing a measure of structural similarity or perceptual similarity between images as described in Wang, Zhou; Bovik, A. C.; Sheikh, H. R.; Simoncelli, E. P. (2004 Apr. 1). "Image quality assessment: from error visibility to structural similarity". IEEE Transactions on Image Processing. 13 (4): 600-612.

In other implementations, loss is determined using a boundary consistency loss algorithm, which calculates an L1 or L2 loss (sum of squared differences) over the first and last k number of columns of the output image, where k is a pre-selected variable representing number of pixels, and $k \geq 1$.

In other implementations, variation loss algorithms are used to determine a total variation loss measuring the sum of gradient over patches of the output to ensure smoothness.

In other implementations, perceptual loss algorithms use a pre-trained feature extraction CNN, where initial layers of another network are pre-trained for an image recognition task. In using perceptual loss algorithms, both the output and ground-truth are passed through the pre-trained layers to obtain "features" (output of this secondary network) and an L2 loss is measured between the features. Thus, the perceptual loss algorithms measure similarity not just in absolute color values but in a feature-space.

In other implementations, adversarial loss algorithms calculate loss by employing a Generative Adversarial Network (GAN) where a separate network (e.g. "Discriminator") is trained to classify output from the primary completion network (e.g. "Generator") as being from the ground-truth image set (e.g. "real") or synthesized by the generator (e.g. "fake"). In implementations, trained mechanisms are described in LS-GAN: https://arxiv.org/abs/1611.04076 ("Least Squares Generative Adversarial Networks") and W-GAN: https://arxiv.org/abs/1704.00028 ("Improved Training of Wasserstein GANs").

In implementations, the perceptual quality of the output when used as a reflection map may need to be improved. In implementations, one such approach is to employ the boundary consistency loss algorithms, as used to identify pixel loss. In other implementations, an approach is to minimize the visibility by blurring the pixels along the seam of the reflection map prior to using the map for reflection. If using spherical projection, yet another approach to improving the perceptual quality of the output is to rotate the input environment map such that the seam appears "behind the object". This is done in implementations by rotating the input to the network, processing and completing the rotated environment map, and then rotating the output back to the original coordinate system. In some implementations, during training, a certain number of specially created data batches are used to improve temporal consistency of synthesized environment maps. For example, in each specially created data batch a single original complete environment map may be used. Moreover, from each specially created data batch, a method may create multiple training inputs with overlapping but progressively increasing known subsets of pixels. Thus, in some implementations, intensity values used at an unknown subset of pixels may be maintained (e.g., kept the same) across the training inputs. Furthermore, for these specially created batches, a variance loss may be added that penalizes variance across the generated outputs from the network for this batch during training. In some implementations, different metrics are employed as a loss function to objectively reduce particular types of variation (e.g., pixel intensity loss, structural loss, or color histogram-based loss) across the generated environment maps of a batch, Moreover, an application may generate multiple environment maps in a CGR scene at different positions. In order to ensure consistency in the synthesized/completed parts of the environment maps obtained from the network, the unknown pixels of the multiple environment maps may be set to the same random values across all the maps. As a result, the encoder portion of the network will generate similar outputs. An application may also use known metadata about the scene, such as scene category information (e.g., indoor, outdoor, beach, living room, etc.), information from the camera (ISP, light sensor, or images, such as exposure time, exposure offset, ISO value, ambient light intensity, ambient light temperature, etc.), or derived quantities (e.g., estimated scene luminance). Using this information, the unknown pixels can be set to random values in some or all regions that are biased to a certain color/illumination scheme. For example, an implementation may use the lengths of the exposure time exposure offset, and ISO value of the camera to estimate the scene luminance and determine if the scene is outdoors during the daytime and hence set the random values in certain regions such that the blue channel has higher values than the other channels. This may be used to bias the network to synthesize 'sky' regions.

Furthermore, while environment mapping is an efficient method of rendering a reflective surface, the speed of computer graphics rendering may be further increased by calculating a position of a reflected ray at each vertex of a given geometry and then interpolating the position across polygons to which the vertex is attached. Thus, it becomes unnecessary to recalculate every individual pixel's reflection direction. Also, in order to produce a more realistic reflection, each of many face normals, e.g., direction a given point on a polygon is facing, of a virtual object may be used in tandem with an environment map. Thus, the angle of reflection at a given point on a CGR object can take the normal map into consideration, allowing an otherwise flat surface to appear textured, e.g., corrugated metal or brushed aluminum. In some implementations, the network is trained with high dynamic range (HDR) images such that the output environment maps contain intensities beyond the 8 bit range per channel. For example, the output maps may be 16 bit or 32 bit floating point intensity values for each channel. Moreover, these intensities may correspond to light intensities. In some implementations, HDR environment maps are utilized by the rendering engine to better light the object beyond use for reflections. Furthermore, some implementations employ one or more post-processing steps to extract information about light sources, such as light type (e.g., point light, area light, etc.), light direction, light intensity and/or light temperature from the output environment map. For example, such post-processing steps may be employed by rendering engines to add associated light into the rendered scene.

Figure 6:
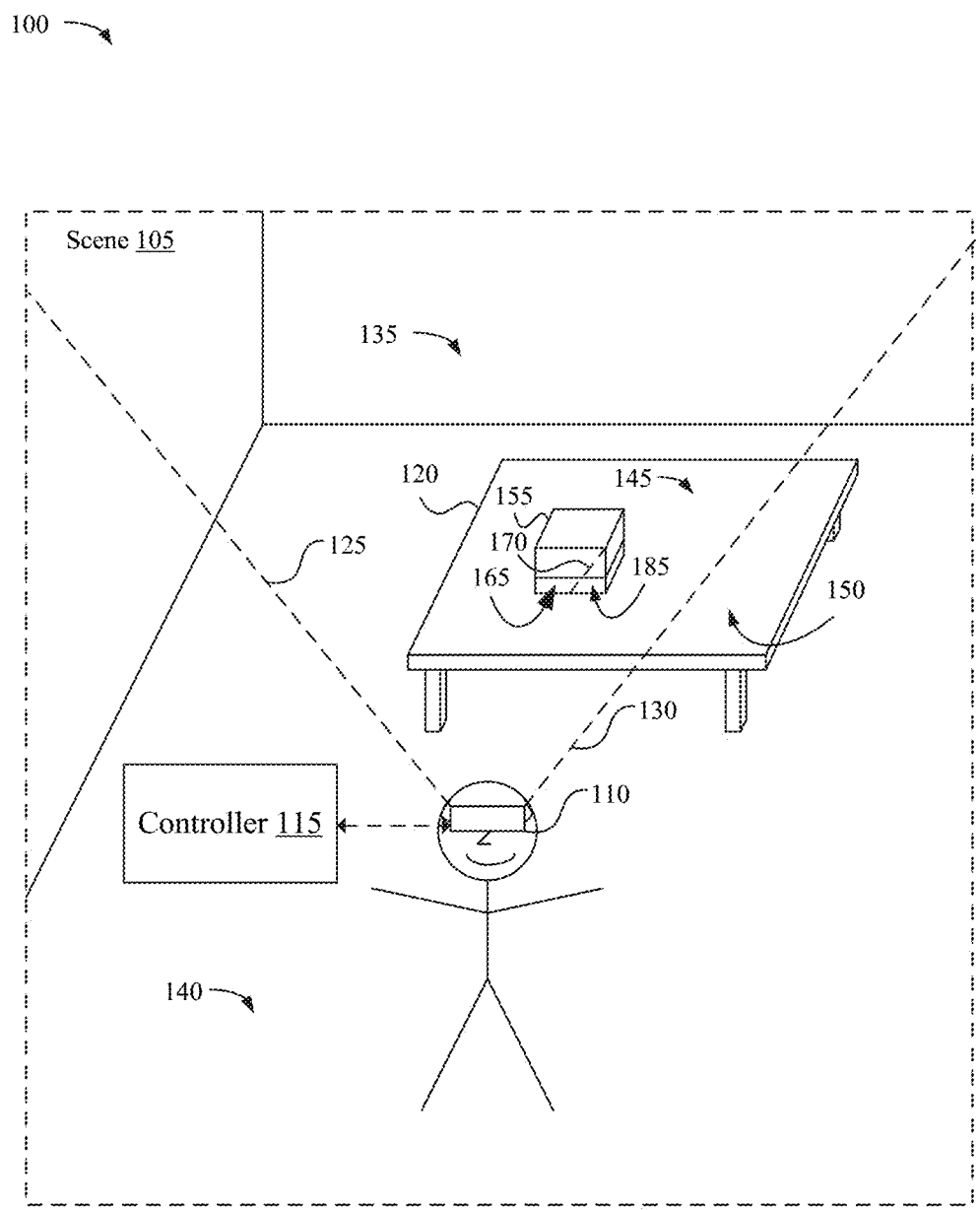
FIG. 6 is the operating environment of FIG. 1 with the computer-generated reality (CGR) object and a reflective surface of the CGR object.

FIG. 6 is the operating environment 100 of FIG. 1 with the CGR object 155. As shown in the exemplary implementation, the CGR object 155 is depicted including the generated reflection 165 and the synthesized reflection 185. In implementations, the CGR object 155 may be rendered in the operating environment 100 on a screen, e.g., a display of a consumer cell-phone. In other implementations, the CGR object 155 may be rendered in the operating environment 100 on a semi-transparent display, e.g., a wearable see-through HMD.

Figure 7B:
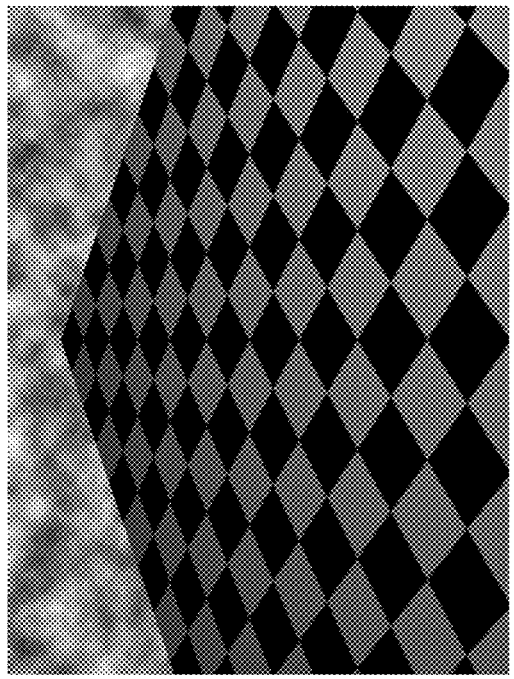
FIGS. 7A-7J illustrate data stored by an application in accordance with some implementations.
Figure 7D:
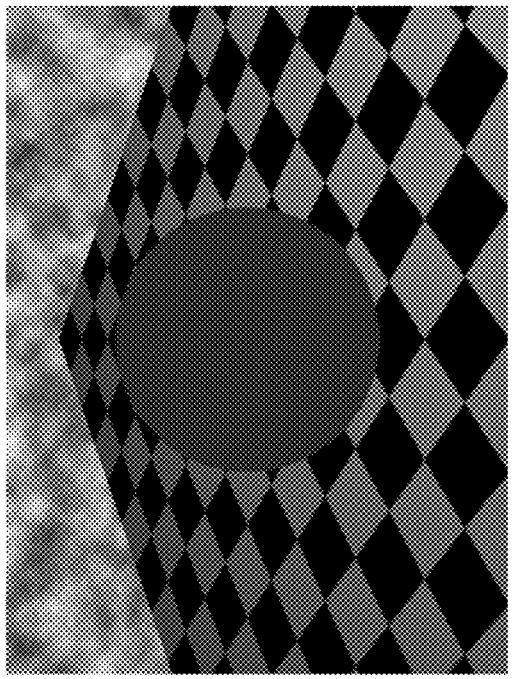
Figure 7A:
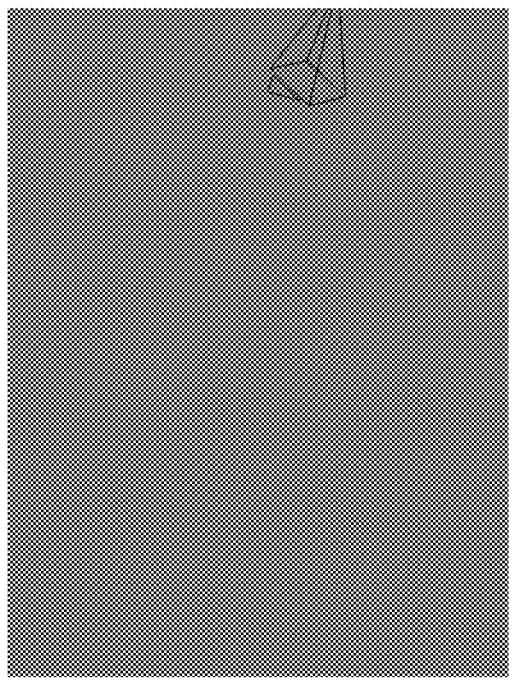
Figure 7C:
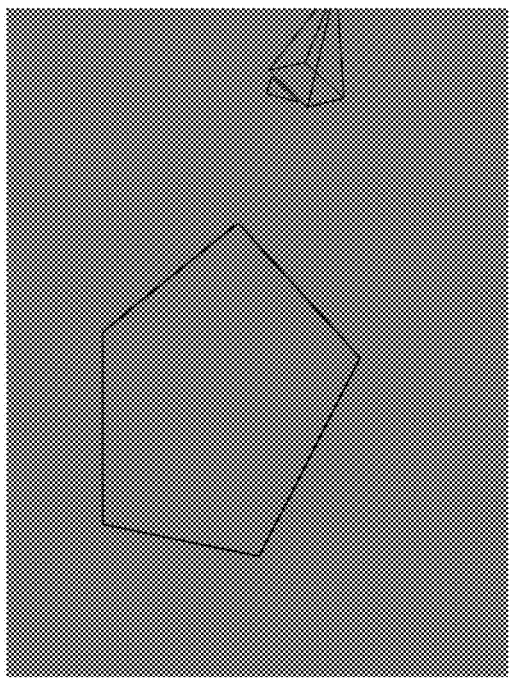
Figure 7E:
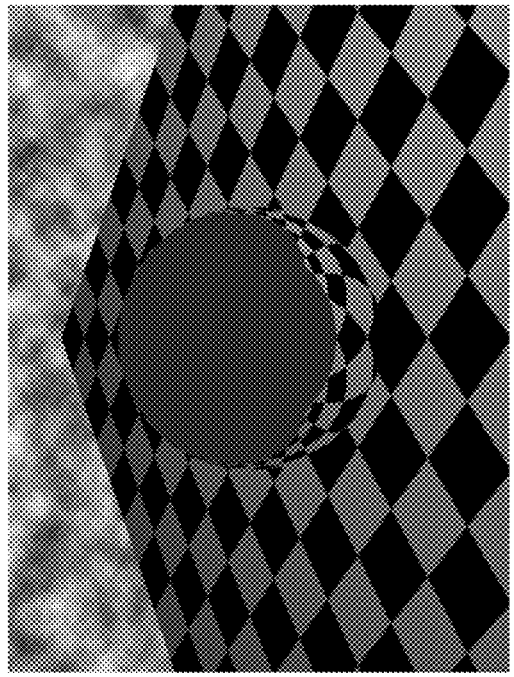
Figure 7G:
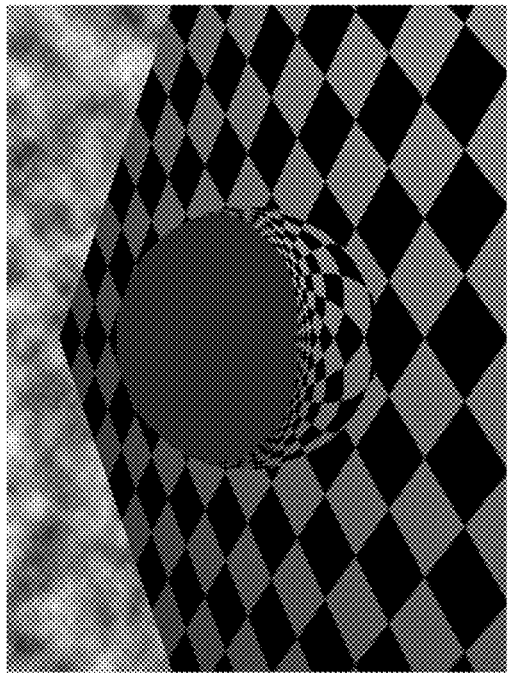
Figure 7F:
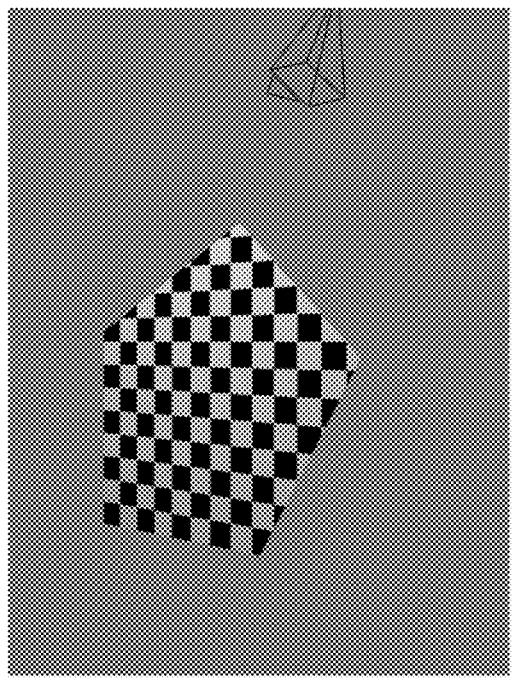
Figure 7H:
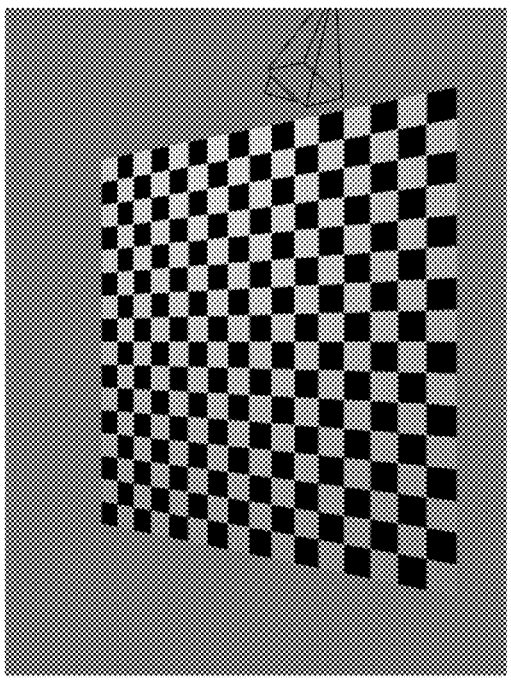
Figure 7J:
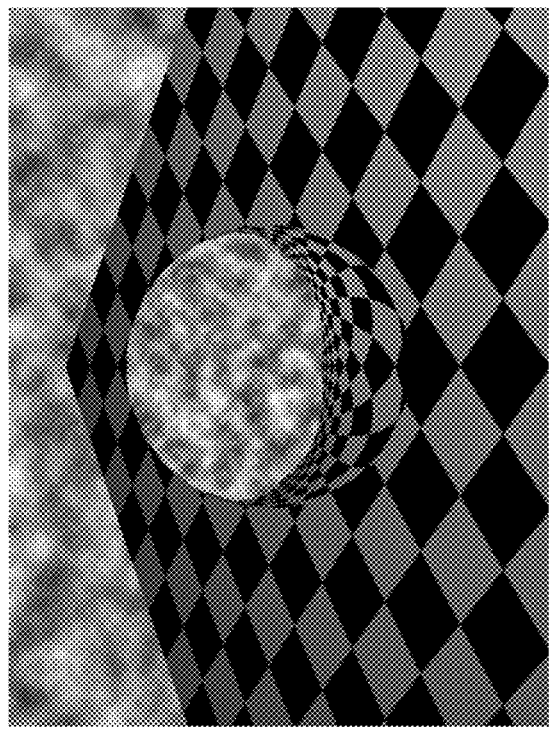
Figure 7I:
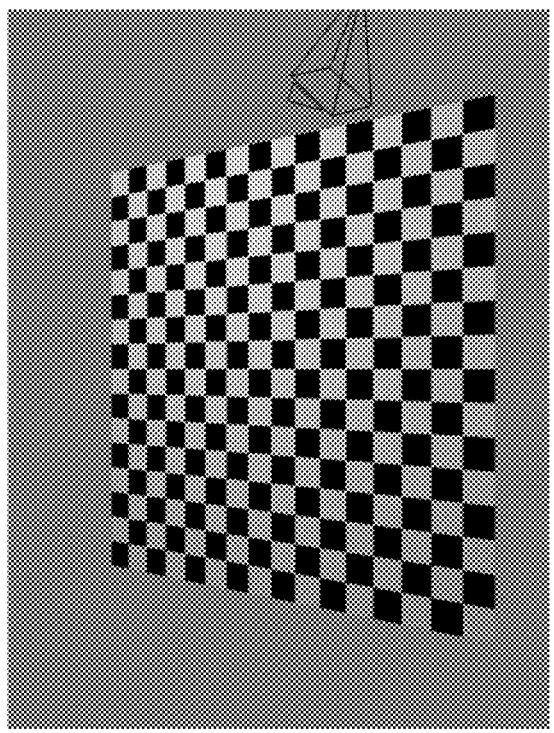

FIGS. 7A-7J illustrate data stored by an application in accordance with some implementations. In exemplary FIG. 7A, an application may have no stored information relating to the physical scene and thus the application may store only a blank initialization. As shown in FIG. 7B, the application may in this case only display the scene without any CGR objects. As shown in FIG. 7C, the application may determine and store a geometry of at least part of the physical scene. As shown in FIG. 7D, a CGR object, e.g., a sphere, is placed in the scene geometry. For purposes of illustration, the example texture of the physical scene is unknown at this point and therefore the CGR object does not reflect the physical environment. In FIG. 7E, the application determines the texture of the scene geometry. In FIG. 7F, the texture of the scene geometry is reflected on the CGR object, resulting in an incomplete reflection. In FIG. 7G, the determined geometry of the scene geometry is extended, e.g., along a plane, and texture for the extended geometry is determined. In FIG. 7H, the CGR object reflects the extended geometry of the physical scene with the synthesized texture, resulting in a more realistic visual appearance. Without determining any additional knowledge of the physical scene, as shown in FIG. 7I, the application may extend the texture in the environment map used to render the reflection of the physical environment on the CGR object resulting in a yet more realistic and more complete visual appearance of the CGR object, as shown in FIG. 7J. Moreover, the method used to extend the environment map may be a supervised machine learning model. Furthermore, the supervised machine learning model may have learned from training data about what the unknown part of the environment map may look like given the appearance of the known part. For example, in this illustrative scenario, the model may have learned that checker board patterns often occur in cloudy outdoor environments. Therefore, the CGR object of FIG. 7J depicts a CGR object including the reflection of an extended environment map with a cloud texture.

Figure 8:
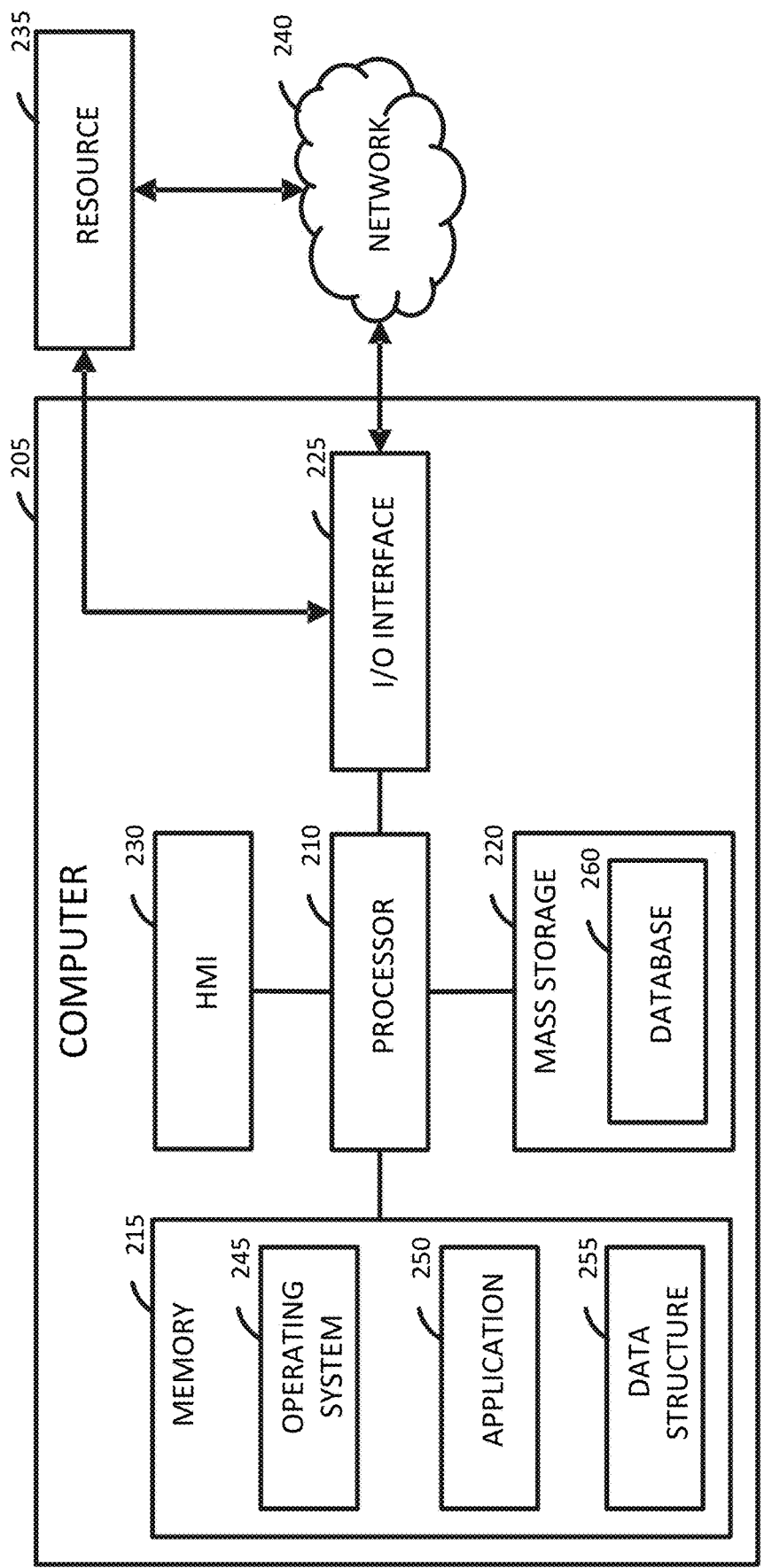
FIG. 8 is a functional block diagram illustrating a system for rendering a reflective surface of a CGR object in accordance with some implementations.

With reference to FIG. 8, the controller 115 and/or recorder/camera 110 may be implemented on one or more computer devices or systems, such as exemplary computer system 205. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the computer system 205 may include a processor 210, a memory 215, a mass storage memory device 220, an input/output ("I/O") interface 225, and a Human Machine Interface ("HMI") 230. The computer system 205 may also be operatively coupled to one or more external resources 235 via the communication network 240 or I/O interface 225. External resources 235 may include, but are not limited to, servers, databases, mass storage devices, peripheral devices, cloud-based network services, or any other suitable computer resource that may be used by the computer system 205.

The processor 210 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 215 (e.g., microprocessors, application-specific integrated-circuits ("ASICs"), field-programmable gate arrays ("FPGAs"), graphics processing units ("GPUs"), central processing units ("CPUs"), processing cores, and/or the like). The memory 215 may include a single memory device or a plurality of memory devices including, but not limited to, read-only memory ("ROM"), random access memory ("RAM"), volatile memory, non-volatile memory, static random access memory ("SRAM"), dynamic random access memory ("DRAM"), flash memory, cache memory, or any other device capable of storing information. The mass storage memory device 220 may include data storage devices such as a hard drive, optical drive, tape drive, non-volatile solid state device, or any other device capable of storing information.

The processor 210 may operate under the control of an operating system 245 that resides in the memory 215. The operating system 245 may manage computer resources so that computer program code embodied as one or more computer software applications, such as an application 250 residing in memory 215, may have instructions executed by the processor 210. In an alternative implementation, the processor 210 may execute the application 250 directly, in which case the operating system 245 may be omitted. One or more data structures 255 may also reside in memory 215, and may be used by the processor 210, operating system 245, or application 250 to store or manipulate data.

The I/O interface 225 may provide a machine interface that operatively couples the processor 210 to other devices and systems, such as the communication network 240 (e.g., universal serial bus ("USB"), FIREWIRE, THUNDERBOLT, IEEE 802.3x, IEEE 802.11x, IEEE 802.16x, global system for mobile communications ("GSM"), code division multiple access ("CDMA"), time division multiple access ("TDMA"), global positioning system ("GPS"), infrared ("IR"), BLUETOOTH, ZIGBEE, and/or the like type interface) or the one or more external resources 235. The application 250 may thereby work cooperatively with the communication network 240 or the external resources 235 by communicating via the I/O interface 225 to provide the various features, functions, applications, processes, or modules comprising implementations of the invention. The application 250 may also have program code that is executed by the one or more external resources 235, or otherwise rely on functions or signals provided by other system or network components external to the computer system 205. Indeed, given the nearly endless hardware and software configurations possible, persons having ordinary skill in the art will understand that implementations of the invention may include applications that are located externally to the computer system 205, distributed among multiple computers or other external resources 235, or provided by computing resources (hardware and software) that are provided as a service over the communication network 240, such as a cloud computing service.

The HMI 230 may be operatively coupled to the processor 210 of computer system 205 in a known manner to allow a user to interact directly with the computer system 205. The HMI 230 may include video or alphanumeric displays, a touch screen, a speaker, and any other suitable audio and visual indicators capable of providing data to the user. The HMI 230 may also include input devices and controls such as an alphanumeric keyboard, a pointing device, keypads, pushbuttons, control knobs, microphones, etc., capable of accepting commands or input from the user and transmitting the entered input to the processor 210.

A database 260 may reside on the mass storage memory device 220, and may be used to collect and organize data used by the various systems and modules described herein. The database 260 may include data and supporting data structures that store and organize the data. In particular, the database 260 may be arranged with any database organization or structure including, but not limited to, a relational database, a hierarchical database, a network database, or combinations thereof. A database management system in the form of a computer software application executing as instructions on the processor 210 may be used to access the information or data stored in records of the database 260 in response to a query, where a query may be dynamically determined and executed by the operating system 245, other applications 250, or one or more modules.

Figure 9:
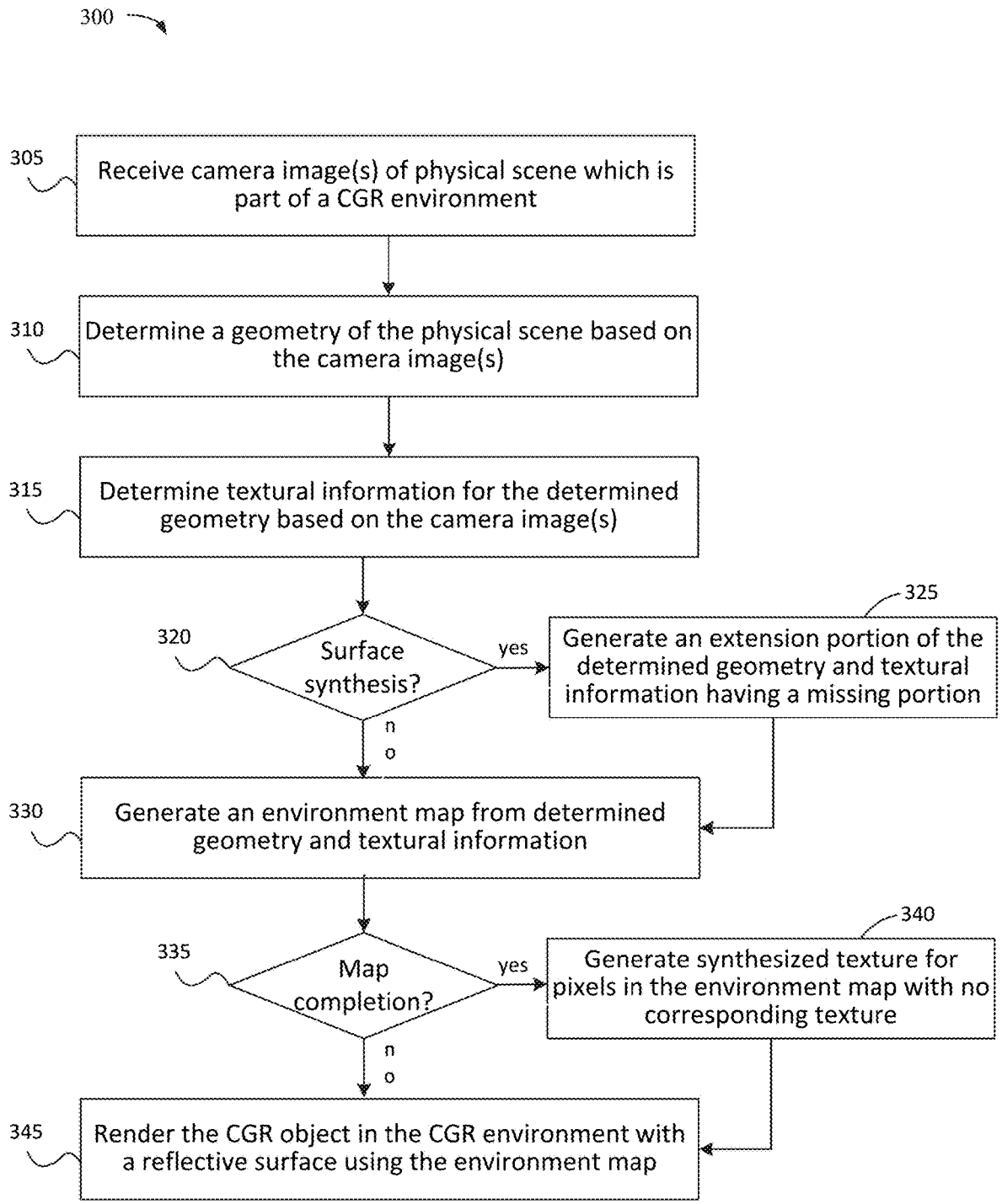
FIG. 9 is a flowchart representation of a method of rendering a reflective surface of a CGR object in accordance with some implementations.

FIG. 9 is a flowchart representation of a method 300 of rendering a reflective surface of a CGR object in accordance with some implementations. In some implementations, the method 300 is performed by a device (e.g., controller 115 of FIGS. 1-2 & 5), such as a mobile device, desktop, laptop, or server device. The method 300 can be performed on a device that has a screen for displaying 2D images and/or a screen for viewing stereoscopic images such as an HMD or an AV display. In some implementations, the method 300 is performed by processing logic, including hardware, firmware, software, or a combination thereof. In some implementations, the method 300 is performed by a processor executing code stored in a non-transitory computer-readable medium (e.g., a memory).

At block 305, the method 300 receives one or more camera images of a physical scene. The images may be captured by either a local or remote recorder/camera and, in implementations, a recorder/camera may be a stand-alone device, may be incorporated into a mobile phone or video game console, or may be included in an HMD. The light reflected by a physical surface may be captured by the one or more camera images. In implementations, the method may combine the one or more camera images of the physical scene to form a single image. Hence, the one or more camera images capture a portion of the physical scene, leaving a different portion of the physical scene uncaptured. Part of the surface may be included in the captured portion and a separate part of the surface may be included in the uncaptured portion of the physical scene.

At block 310, the method 300 determines a geometry of at least part of the physical scene as part of a CGR environment based on the camera image(s). In an implementation, the device or controller identifies the geometry based on transitions or differences in texture, e.g., color, within the one or more camera images of the physical scene. For example, the geometry may include a black area and the immediately adjacent area of the physical scene may be white. Thus, the method may identify the boundaries of a given geometry by identifying the areas of transitioning texture between light and dark colors. In another embodiment, the geometry of the physical environment may be determined using a structure-from-motion (SfM) method, a simultaneous localization and mapping (SLAM) method, a computer vision passive stereo method, a computer vision active stereo method comprising structured light, a photometric stereo method, a shape-from-shading method, a shape-from-defocus method, a geometric model-fitting method, a machine learning method, or a monocular depth estimation method. In some implementations, block 310 uses additional inputs, e.g., the readings of an inertial measurement unit (IMU), an accelerometer, or a gyroscope.

At block 315, the method 300 determines textural information for the determined geometry of the CGR environment. In implementations, textural information associated with the CGR environment may include color or appearance, as well as patterning, shadowing, and/or specular highlighting. In an implementation, the method identifies the darkest texture, e.g., color, for each surface position from the one or more camera images and determines the textural information of the CGR environment based on the darkest texture. In implementations where the CGR environment includes specular highlighting, the specular highlighting may be presented as a lighter texture and, accordingly, the method may use the textural information associated with the darkest texture to repeat, accommodate for, or eliminate the specular highlighting. Block 315 may further use information on camera parameters or ISP parameters which led to the one or more images, to determine normalized textural information that is independent from these parameters, such as exposure time or gain.

At block 320, the method 300 decides whether or not it should perform surface synthesis. This decision can be made based on a static setting decided, for example, by an application developer or a user, e.g. may be set to always decide "yes" or always decide "no". This decision can be further made based on properties of the CGR environment, such as the determined geometry of the physical scene as well as any CGR objects in the CGR environment.

At optional block 325 (e.g., performed based on the decision of block 320), the method 300 synthesizes an extension portion of a surface of the CGR environment having a missing portion. In identifying the missing portion, the method may identify whether the captured surface adequately represents the surface based on the texture of the captured surface in comparison to the immediately surrounding texture, e.g., whether the captured portion is terminated by the surrounding environment. In implementations, the method may generate a 3D model of the physical environment based on the one or more images and, if the captured surface does not adequately represent the surface, a synthesized surface may be generated by extending the geometry of the captured surface in the 3D model. The method may then apply any identified texture information associated with the surface. Thus, the method extends the model of the 3D environment to include the synthesized surface. In an exemplary implementation, the method may assume the captured surface extends indefinitely when generating the synthesized surface. Alternatively, the method may make alternative assumptions about the surface based on any number of factors, including texture, characteristics of the surface in relation to database references, and/or a repeating pattern or texture of the surface. Moreover, in implementations, the method may identify and compensate for specular highlights on the captured surface when generating the synthesized surface. In implementations, the method may blend or merge the appearance of the synthesized surface with the captured surface to minimize any harsh or abrupt transitions in texture.

At block 330, the method 300 generates an environment map including the determined geometry and textural information. In implementations, the method may select a 3D point, e.g., a center of projection, where the reflection of the environment is accurately depicted in relation to the position of the CGR object in the physical environment. Furthermore, one or more environment maps may be generated around one or more centers of projection using a rendering engine to represent the textures of the CGR environment. In implementations, any suitable projection may be used to generate the environment map(s), e.g., sphere mapping, cube mapping, paraboloid mapping, pyramid mapping, octahedron mapping, and/or the HEALPix mapping.

At block 335, the method 300 decides whether or not it should perform map completion. This decision can be made based on a static setting decided, for example, by an application developer or a user, e.g. it may be set to always decide "yes", or always decide "no". This decision can be further made based on properties of the environment map generated in 330, such as the percentage of pixels with known texture information.

At optional block 340 (e.g., performed based on the decision of block 335), the method 300 generates synthesized texture for pixels in the environment map with no corresponding/known texture. In implementations, an image and a mask associated with the environment map are stored, where the mask has binary values to indicate which pixels in the image are known and which are incomplete, e.g., need to be synthesized/filled. Moreover, the completion of an environment map may include synthesizing a corresponding texture for the identified pixels with no texture by extending the existing texture and/or employing synthesis algorithms. Furthermore, additional processing steps may be performed to the one or more textures themselves, individually or as a collection.

At block 345, the method 300 renders the CGR object in the CGR environment with a reflective surface. In implementations, the method 300 generates the appearance of the reflective surface of the CGR object based on an enhanced environment map (block 330 and/or block 340). Moreover, the extension portion of the surface and/or the synthesized texture are not displayed to the user and are used only for generating the appearance of the reflective surface of the CGR object. In other implementations, the method may generate the appearance of the reflective surface of the CGR object based on the captured surface and/or synthesized texture separately from generating the appearance of the reflective surface of the CGR object without the extended surface and/or synthesized texture. Thus, in implementations, the method 300 may separately generate appearances of the reflective surface based on the environment map (block 330) and the enhanced environment map (block 340) and then blend or merge the appearance of the reflective surface based on the separate generations. The generated reflective surface of the CGR object appears to include an uncaptured portion of the surface and/or the missing pixels and, through the inclusion of the synthesized surface and/or the missing pixels, the method more realistically approximates the appearance of the reflection of a physical object. In implementations, the method may generate, based on one or more environment maps and/or one or more 3D models, the appearances of the reflective surfaces of multiple CGR objects within the physical scene.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first surface could be termed a second surface, and, similarly, a second surface could be termed a first surface, without changing the meaning of the description, so long as all occurrences of the "first surface" are renamed consistently and all occurrences of the "second surface" are renamed consistently. The first surface and the second surface are both surfaces, but they are not the same surface.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of rendering a reflective surface of a computer-generated reality ("CGR") object based on surface synthesis in a CGR environment, comprising:
at a device with one or more processors and a computer readable medium:
determining a first geometry and textural information of a CGR environment, wherein the CGR environment is based on one or more camera images of a physical scene;
determining that the CGR environment includes a surface having a captured surface portion and a missing portion, the surface in the CGR environment representing a surface in the physical scene and the missing portion of the surface in the CGR environment corresponding to an uncaptured portion of the surface in the physical scene;

generating an extension portion for the missing portion based on an assessment of whether the captured surface portion has been cutoff by a boundary defined by a captured geometry, wherein the extension portion is generated by extending a 3D geometry of the captured surface portion based on a characteristic of the captured surface portion;

determining a second geometry of the CGR environment representing the physical scene based on the extension portion;

determining second textural information, wherein the second textural information is synthesized for the extension portion by:
   determining a characteristic of the captured surface portion that matches a stored reference characteristic of an object; or
   identifying a repeating pattern or texture of the captured surface portion;

generating an environment map using the determined second geometry and the second textural information; and rendering a CGR object in the CGR environment, wherein an appearance of a reflective surface of the CGR object is determined based on the environment map.

2. The method of claim 1, further comprising:
determining a three-dimensional ("3D") position of the CGR object in the CGR environment; and
determining a reflectance of the CGR object, wherein the appearance of the reflective surface of the CGR object is based at least in part on the 3D position and the reflectance of the CGR object.

3. The method of claim 2, wherein a size of the extension portion is determined based at least in part on the 3D position, a geometry, and the reflectance of the CGR object.

4. The method of claim 1, further comprising:
blending the extension portion and at least one adjacent portion.

5. The method of claim 1, further comprising:
selecting a center of projection of the environment map based on a three-dimensional ("3D") position of the CGR object, wherein generating the environment map is based at least in part on the center of projection of the environment map.

6. The method of claim 1, wherein the second geometry is determined based at least in part on a plurality of extension portions.

7. The method of claim 1, further comprising:
generating a plurality of environment maps; and
rendering multiple CGR objects in the CGR environment, wherein appearances of reflective surfaces of the multiple CGR objects are determined based on the plurality of environment maps.

8. The method of claim 1, wherein the textural information comprises information about color, pattern, reflectance, or irradiance.

9. The method of claim 1, further comprising:
identifying a darkest texture from the one or more camera images of the physical scene, wherein the textural information is based at least on part on the darkest texture.

10. The method of claim 1, further comprising:
determining that the environment map includes pixels with no corresponding texture;
generating synthesized texture for the pixels with no corresponding texture; and
enhancing the environment map by replacing the pixels with no corresponding texture with the synthesized texture.

11. The method of claim 1, wherein the CGR object in the CGR environment is rendered on a screen or on a semi-transparent display apparatus.

12. The method of claim 1, wherein the extension portion is generated by extending the 3D geometry of the captured surface portion to extend a 3D model of the physical scene to include the extension portion.

13. The method of claim 1, wherein the extension portion is sized based on the characteristic of the captured surface portion.

14. A system for rendering a reflective surface of a computer-generated reality ("CGR") object based on environment map synthesis in a CGR environment, comprising:
a device with one or more processors; and
a computer readable medium including instructions that, when executed by the one or more processors, cause the system to:
   determine a first geometry and textural information of a CGR environment, wherein the CGR environment is based on one or more camera images of a physical scene;
   determine that the CGR environment includes a surface having a captured surface portion a missing portion, the surface in the CGR environment representing a surface in the physical scene and the missing portion of the surface in the CGR environment corresponding to an uncaptured portion of the surface in the physical scene;
   generate an extension portion for the missing portion based on an assessment of whether the captured surface portion has been cutoff by a boundary defined by a captured geometry, wherein the extension portion is generated by extending a 3D geometry of the captured surface portion based on a characteristic of the captured surface portion;
   determine a second geometry of the CGR environment representing the physical scene based on the extension portion;
   determine second textural information, wherein the second textural information is synthesized for the extension portion based on identifying one or more patches of the captured surface portion;
   generate an environment map using the determined second geometry and the second textural information; and
   render a CGR object in the CGR environment, wherein an appearance of a reflective surface of the CGR object is determined based on the environment map.

* * * * *